United States Patent
Cebula et al.

(10) Patent No.: US 8,002,357 B2
(45) Date of Patent: Aug. 23, 2011

(54) ADJUSTABLE ARMREST FOR A ROAD VEHICLE

(75) Inventors: Harry J. Cebula, Livonia, MI (US);
Thomas Judy, Plymouth, MI (US);
Mark L. Cutshall, Livonia, MI (US);
Jozef Kwiecinski, Macomb, MI (US)

(73) Assignee: E & E Manufacturing company, Inc., Plymouth, MI (US)

( * ) Notice: Subject to any disclaimer, the term of this patent is extended or adjusted under 35 U.S.C. 154(b) by 0 days.

(21) Appl. No.: 12/857,160

(22) Filed: Aug. 16, 2010

(65) Prior Publication Data

US 2010/0308636 A1    Dec. 9, 2010

Related U.S. Application Data

(62) Division of application No. 12/166,438, filed on Jul. 2, 2008.

(60) Provisional application No. 60/958,279, filed on Jul. 3, 2007.

(51) Int. Cl.
*B60N 2/46* (2006.01)

(52) U.S. Cl. ............................. 297/411.32; 297/411.35

(58) Field of Classification Search ............... 297/411.3, 297/411.32, 411.35, 411.38
See application file for complete search history.

(56) References Cited

U.S. PATENT DOCUMENTS

| | | |
|---|---|---|
| 3,116,093 A | 12/1963 | Bosack |
| 4,141,586 A | 2/1979 | Göldner et al. |
| 4,230,414 A | 10/1980 | Cheshire |
| 4,270,798 A | 6/1981 | Harder, Jr. |
| 4,307,913 A | 12/1981 | Spiegelhoff |
| 4,310,196 A | 1/1982 | Vogel |
| 4,435,011 A | 3/1984 | Hakamata |
| 4,496,190 A | 1/1985 | Barley |
| 4,586,748 A | 5/1986 | Dingler et al. |
| 4,630,866 A | 12/1986 | McFarlane |
| 4,655,501 A | 4/1987 | Ishigami et al. |
| 4,819,501 A | 4/1989 | Kraus et al. |
| 4,946,226 A | 8/1990 | Hurn et al. |
| 4,978,171 A | 12/1990 | Tateyama |
| 5,076,645 A | 12/1991 | Yokota |
| 5,106,160 A | 4/1992 | Nomura et al. |
| 5,188,423 A | 2/1993 | Meiller et al. |
| 5,290,087 A | 3/1994 | Spykerman |
| 5,320,415 A * | 6/1994 | Krebs ..................... 297/411.32 |
| 5,346,284 A | 9/1994 | Dauphin |
| 5,489,143 A | 2/1996 | Adachi et al. |
| 5,702,157 A | 12/1997 | Hurite |
| 5,743,595 A | 4/1998 | Kirdulis |
| 5,769,496 A | 6/1998 | Gryp |

(Continued)

OTHER PUBLICATIONS

International Search Report for PCT/US2008/069150 dated Oct. 3, 2008.

*Primary Examiner* — David Dunn
*Assistant Examiner* — Erika Garrett
(74) *Attorney, Agent, or Firm* — Brooks Kushman P.C.

(57) ABSTRACT

An adjustable armrest for a vehicle seat comprising an armrest housing pivoted on a seat back frame and a pair of locking elements in the housing, one of which is adjustable and the other being fixed. A seat back stop is engageable with the adjustable locking element. A seat occupant, using an armrest release mechanism, may adjust the relative positions of the locking elements to change a desired active position of the armrest. A memory feature permits return of the armrest to the desired active position from an upright stowed position.

4 Claims, 11 Drawing Sheets

U.S. PATENT DOCUMENTS

| | | |
|---|---|---|
| 5,984,416 A | 11/1999 | Waldo et al. |
| 6,467,847 B2 * | 10/2002 | Bidare .................... 297/411.32 |
| 6,578,922 B2 | 6/2003 | Khedira et al. |
| 6,698,838 B2 | 3/2004 | Kain |
| 6,702,390 B2 | 3/2004 | Stumpf et al. |
| 6,905,171 B2 | 6/2005 | Knoblock et al. |
| 7,367,627 B2 | 5/2008 | Figueras Mitjans |
| 7,367,727 B2 * | 5/2008 | Hayashi ...................... 400/208 |
| 7,625,046 B2 | 12/2009 | Sanchez |
| 2002/0096928 A1 | 7/2002 | Bidare |
| 2003/0057759 A1 | 3/2003 | Kain |
| 2005/0046258 A1 | 3/2005 | Sanchez |

\* cited by examiner

ADJUSTABLE ARMREST FOR A ROAD VEHICLE

CROSS-REFERENCE TO RELATED APPLICATION

This application is a divisional application of application Ser. No. 12/166,438 filed Jul. 2, 2008 which claims benefit of a provisional application Ser. No. 60/958,279 filed Jul. 3, 2007.

BACKGROUND OF THE INVENTION

1. Field of the Invention

The invention relates generally to seats for vehicles, and particularly to an adjustable armrest for a vehicle seat with position memory.

2. Background Discussion

Contemporary vehicle seating designs typically include a driver seat and a front passenger seat with separate seat frames in side-by-side relationship at a forward location in a vehicle passenger compartment. Rear passenger seats, located rearward in the vehicle passenger compartment, can be independently mounted on separate seat frames, or they can share a common seat frame. Known armrest designs are adjustable angularly about a pivot point on one side of a seat frame so that the armrest, when in use, is disposed at a level above a seat cushion for both the driver seat and the passenger. When the armrest is not in use, it may be tilted about the pivot point to a stowed position, generally parallel to and adjacent a vehicle seat back structure.

To accommodate easy ingress and egress as a passenger enters and leaves the vehicle passenger compartment, the armrest can be moved from a preferred active position to the stowed upward position adjacent one side of the seat upright portion of the seat assembly.

The vehicle seat typically is adjustable to suit the seat occupant's preference and to provide optimum comfort and safety for the seat occupant. The seat back can be pivotally adjusted relative to the seat cushion or the seat cushion can be pivotally adjusted relative to the seat back. The seat assembly can be raised or lowered relative to the vehicle body structure, tilted fore and aft, or moved fore and aft depending upon the seat occupant's preference. Because of the numerous seat adjustment choices available to a seat occupant, it is desirable for the vehicle armrest to have independent armrest adjustment characteristics. The preferred active armrest position for one occupant, furthermore, usually is different than the active armrest position that would be chosen by another occupant.

Known armrest adjustment structures are complex in design, awkward to use and relatively costly to manufacture for use in a high volume vehicle manufacturing facility. The adjustment structure becomes more complex if provision is made for incorporating a so-called memory feature, which would permit the seat occupant to return the armrest to a previously selected active position after having adjusted the armrest to its stowed position.

SUMMARY OF THE INVENTION

The disclosed embodiment of the invention comprises improvements in an adjustable armrest for a driver seat or a passenger seat in a vehicle. The armrest comprises an upholstered armrest housing that is pivotally mounted on one side of an upright portion of a vehicle seat assembly. Provision is made for locking the armrest in a selected active position so that it extends above the level of the seat cushion of the seat assembly when in use. When the armrest is not in use, it may be tilted to a position generally parallel to the upright portion of the seat assembly, thereby permitting improved ingress and egress of a seat occupant as the occupant enters and leaves the vehicle passenger compartment.

An armrest locking mechanism is used for securing the armrest in a preferred active position. The locking mechanism comprises a driver actuated rod that engages a locking element or block that is fixed to an armrest housing pivoted on the vehicle seat frame. An adjustable locking element or block engages the fixed locking element to secure the adjustable locking element against movement relative to the armrest housing. A fixed stop is carried by the seat back portion of the seat frame. The adjustable locking element engages the stop when the armrest is moved from its stowed position to its active position.

An actuator rod engageable with the fixed locking element can be actuated by the seat occupant to move the fixed locking element into and out of engagement with the adjustable locking element. When the armrest is adjusted by the seat occupant to a preferred position, the actuator rod is released from engagement with the fixed locking element whereby the adjustable locking element will limit the arcuate movement of the armrest beyond a preferred angular position when the armrest is moved from the stowed position to the active position.

One disclosed embodiment of the invention includes a spring that urges the fixed locking element into engagement with the adjustable locking element. The adjustment rod that is actuated by the seat occupant, when a change in the desired active operating position is made, moves the fixed locking element against the opposing force of a spring thereby releasing the adjustable locking element to permit the adjustable locking element to engage the fixed stop on the seat back frame when the armrest is at an adjusted angle relative to the seat back assembly.

A trigger mechanism at an end of the armrest assembly includes a cam and cam follower mechanism for adjusting the adjustment rod to release the adjustable locking element.

The interface surfaces of the fixed locking element and the adjustable locking element may be formed with locking teeth or serrations. The locking elements include an interface that defines a wedge that can be designed with a wedge angle to provide a limit for the torque applied to the armrest assembly as a vertical downward force is applied to the armrest assembly. This feature avoids failure of armrest assembly components due to an excessive downward force.

In a second disclosed embodiment of the invention, the locking elements comprise a memory gear and a memory plate that are pivoted on a stop spool connected to the seat frame. The memory gear is disposed between the stop spool and the memory plate. An actuator wedge moves the memory gear into engagement with the stop spool as it is disengaged from the memory plate. Angular relative displacement of the memory gear and the stop spool and angular relative displacement of the memory gear and the memory plate is determined by angular displacement of stop shoulders on the memory gear, the memory plate and the stop spool. The memory plate is part of the structure that supports an arm of a seat occupant.

DESCRIPTION OF EMBODIMENTS OF THE INVENTION

Figure 1:
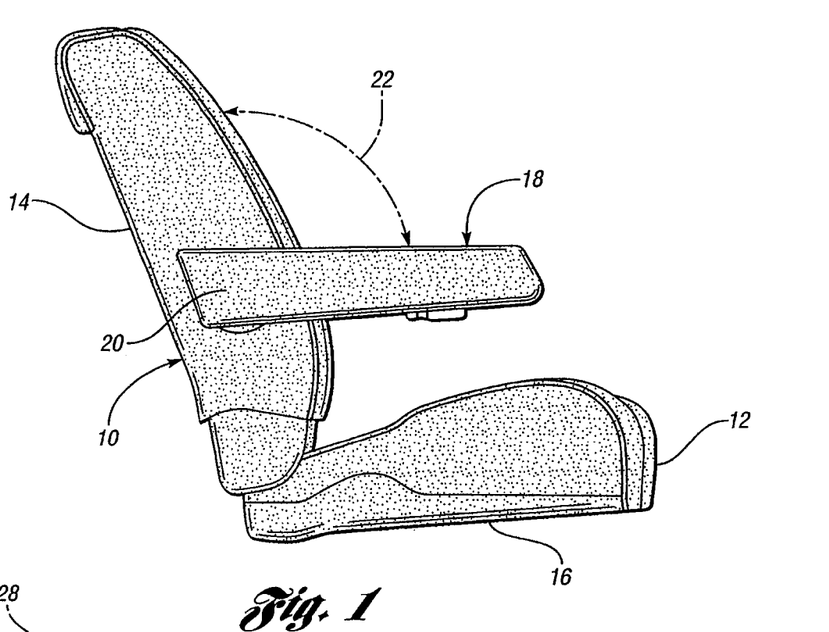
FIG. 1 is a side elevation view of a typical automotive seat assembly with an adjustable armrest.

FIG. 1 shows at 10 a seat for an automotive vehicle. It comprises an upholstered seat cushion portion 12 and an upright seat back portion 14. The seat back portion is adapted to be secured at its underside 16 to a vehicle body structure (not shown). An adjustable armrest assembly 18 is pivoted at 20 to a seat back frame located within the seat back portion 14. The seat back frame is not visible in FIG. 1 because it is covered by upholstery material, as shown. Likewise, an interior frame of the cushion portion 12 of the seat assembly is not visible in FIG. 1 because it is covered by upholstery material, as shown.

The adjustable armrest assembly 18 is pivoted about the pivot point 20 through an adjustment arc shown at 22. The position of the armrest assembly seen in FIG. 1 is the active, or operative, position of the armrest. When the armrest assembly is tilted upward through the arc 22, it assumes a so-called stored upright position adjacent one side of the upright seat back portion 14.

Figure 2:
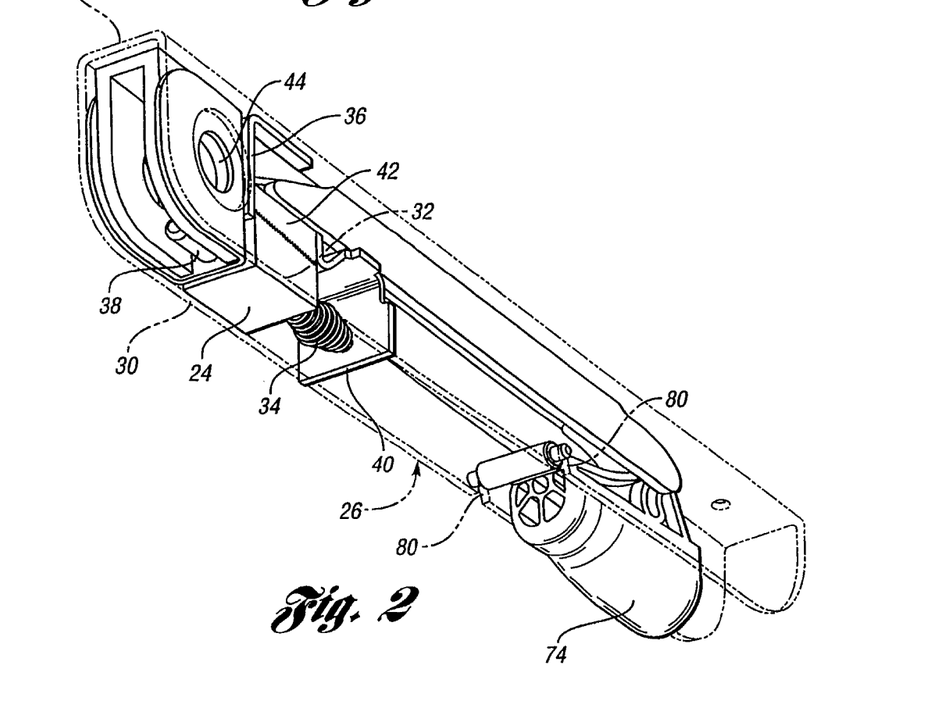
FIG. 2 is an isometric view of the armrest of FIG. 1 wherein the interior of the armrest housing is visible and wherein the upholstered exterior of the armrest is removed.
Figure 7:
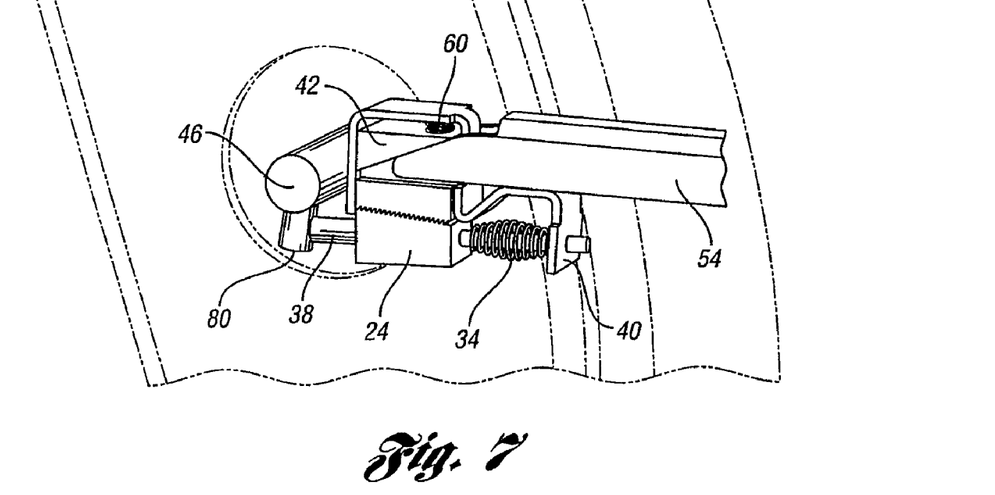
FIG. 7 is a view of the locking elements of FIGS. 3 and 4 together with a fixed stop on the vehicle seat frame adjacent a pivot axis for the armrest assembly.
Figure 8:
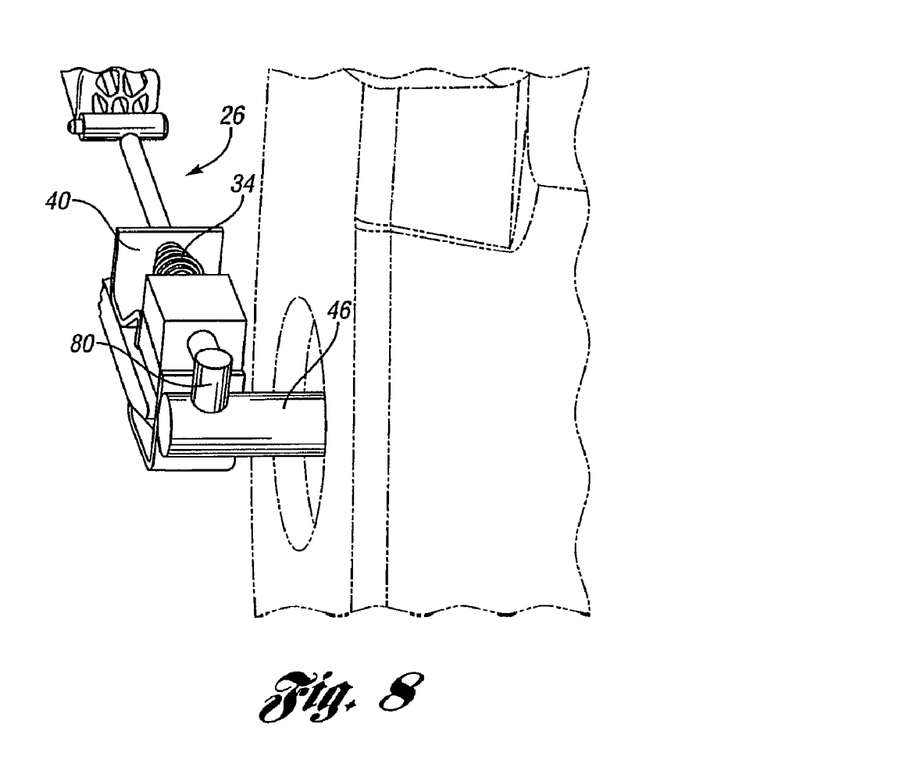
FIG. 8 is an isometric view seen from the pivoted end of the armrest assembly wherein elements in the interior of the armrest housing are visible.

An adjustable block or locking element, seen at 24 in FIG. 2, is located within the interior of an armrest housing 26, which has a generally U-shaped cross-sectional configuration with a housing top 28 and parallel sides 30 and 32. The adjustable locking element 24 is disposed between the housing sides 30 and 32. The adjustable locking element 24 is biased by a spring 34 against a wall 36 formed on a bracket that is secured to the armrest housing, as will be described with reference to FIGS. 3 and 4, as well as FIGS. 5 and 7.

The adjustable locking element 34 is fixed to and supported by a rod 38 extending through the adjustable locking element 24 and through the spring 34. The spring 34 is seated on a second wall 40 of the bracket that is secured to the armrest housing 26. The rod 38 functions as a part of the adjustable locking element.

The adjustable locking element 32 engages a fixed locking element 42 situated between the armrest housing walls 30 and 32.

The armrest housing is provided with a pivot bearing opening 44 through which a pivot element extends. The pivot element, which is secured to the seat back frame, is seen at 46 in FIGS. 7-10.

Figure 3:
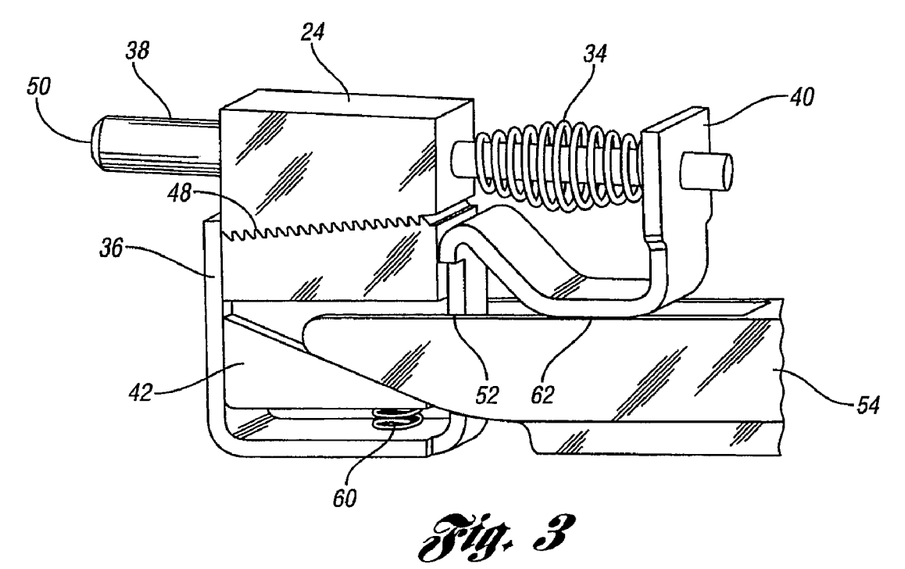
FIG. 3 is a side view of locking elements and a driver operated actuator rod which form a portion of the armrest assembly seen in FIG. 2.

FIG. 3 shows the locked position of the locking elements 24 and 42. The locking elements have interlocking surface features, such as serrations or locking teeth 48, which are engageable when the armrest assembly is in its locked position. The adjustable locking element 24 and rod 38 joined and are slidably supported, as previously mentioned, but they are locked in position when the serrations or teeth 48 are in engagement. The shaft 38 is fixed to the adjustable locking element 24, so when the serrations or teeth 48 are engaged, the position of the end 50 relative to the adjustable arm housing 26 is fixed. The serrations or teeth 48 are formed on juxtaposed surfaces of the locking elements. The surfaces are ramped, as shown, so that an increased force on end 50 of shaft 38 will increase the engaging force on teeth 48.

Figure 4:
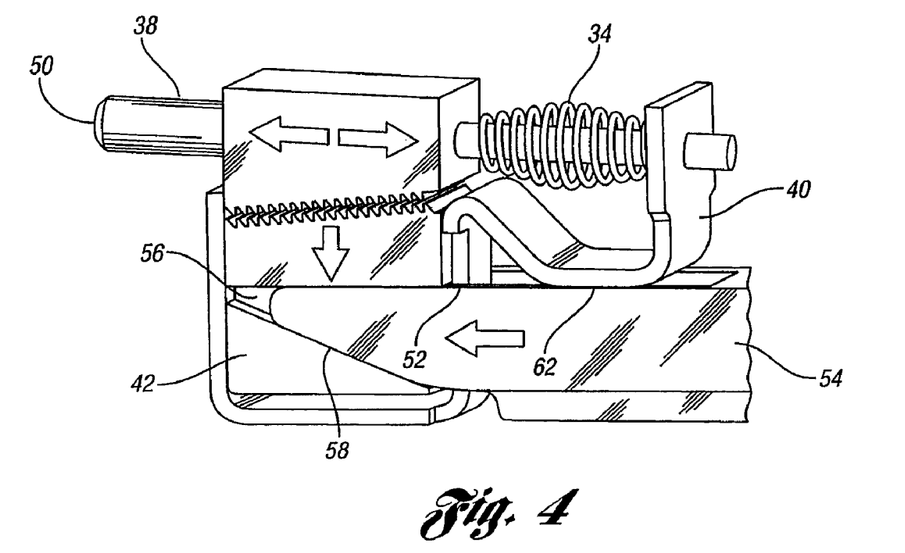
FIG. 4 is a view similar to FIG. 3 although the locking elements are adjusted to an armrest released position.

A bracket, of which the walls 36 and 40 are a part, includes an opening, best seen in FIGS. 3 and 4 at 52, through which an adjustable rod 54 extends. One end of rod 54 is received in a ramped opening 56 in the fixed locking element 42. A ramped surface in the opening 56 engages a ramped surface 58 on the end of the rod 54. When the rod 54 is adjusted in a left-hand direction as viewed in FIG. 4, the ramped surfaces engage, thereby causing the adjustable locking element 42 to shift in a downward direction against the opposing force of a compression spring 60, seen in FIG. 3. At that time, the serrations or teeth 48 on the locking elements 24 and 42 will be separated, thereby permitting the rod 38 and the adjustable locking element 24 to shift in the direction of the vectors seen in FIG. 4. The bracket wall 40 has an opening through which the rod 38 extends so that the rod 38 is end-supported.

An intermediate portion of the bracket, of which the walls 36 and 40 are a part, is slidably supported on the adjustment rod 54, as shown at 62.

Figure 5:
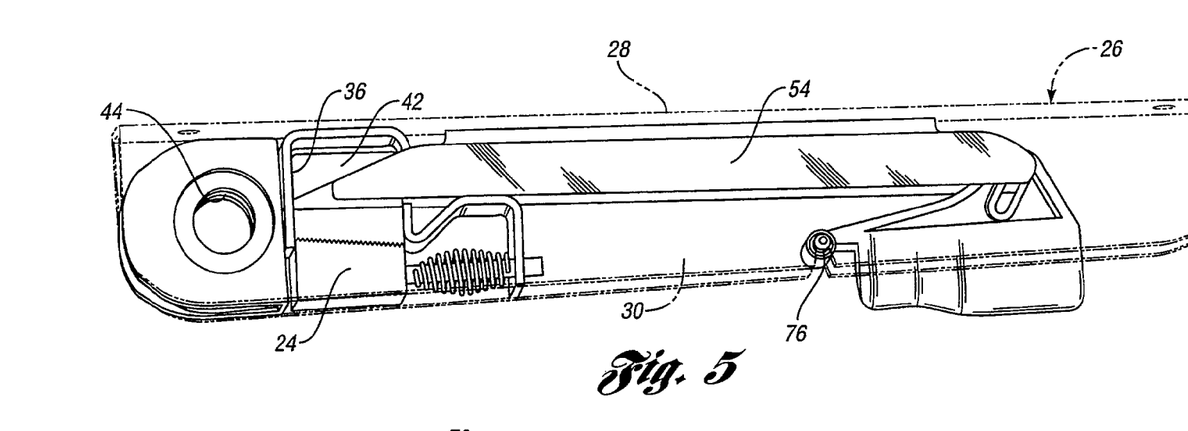
FIG. 5 is a side view of the armrest structure shown in FIG. 2.
Figure 6:
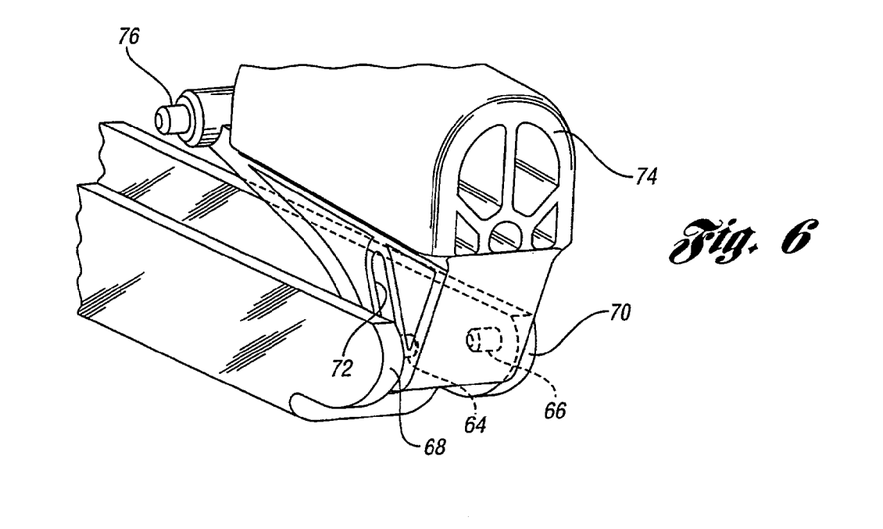
FIG. 6 is an isometric view of the operating end of the adjustment rod seen in FIGS. 2, 3 and 4.

FIGS. 5 and 6 show the actuator trigger end of the adjustment rod 54. The actuator trigger end comprises a pair of cam follower elements 64 and 66, which extend inwardly from spaced sides 68 and 70, respectively. Cam follower element 64 is received in a cam slot 72 of a trigger member 74 that can be gripped by the seat occupant. Trigger member 74 is pivoted on pivot shaft 76, which is received in an opening 80 in wall 30 of the armrest housing 26, as seen in FIG. 2. A corresponding opening 78, seen in FIG. 2, receives the opposite end of the pivot shaft 76.

When the trigger portion 74 is gripped by the seat occupant and is pivoted about the axis of shaft 76 within the armrest housing 26, the cam elements 64 and 66 will traverse their respective cam openings. The adjusting rod 54 then will be shifted in a left-hand direction, as viewed in FIG. 5 and in FIG. 4. This causes the fixed locking element 42 to be separated from the adjustable locking element 24. As the armrest then is pivoted about the pivot shaft 46, the end 50 of the shaft 38 may engage a fixed stop 80 that is fixed to pivot shaft 46, which in turn is fixed to the vehicle seat back frame. As the armrest rotates in a clockwise direction, as viewed in FIG. 5 and in FIG. 1, the end 50 of the shaft 38 will engage the stop 80. This establishes a preferred active position for the armrest assembly. When the seat occupant releases the trigger member 74, the locking elements again will be locked together, as indicated in FIG. 3, as the rod 54 is shifted in a right-hand direction as viewed in FIG. 3. In this way, the desired locked position is established, although it can be changed at any time by the seat occupant by again activating the trigger member 74 to release locking engagement of the locking elements as a new desired position is established.

When the adjustable armrest assembly is moved to the stowed position, which is the upright position described with reference to FIG. 1, the stop 80 will be separated from the end 50 of the rod 38. When the adjustable armrest is in its stowed position, the stop 80 is engaged by upper wall 28 of the armrest housing. It is preferred that a shock absorbing insert, preferably of a suitable plastic material, be positioned to cover the point of impact of the armrest housing against the stop 80.

Figure 9:
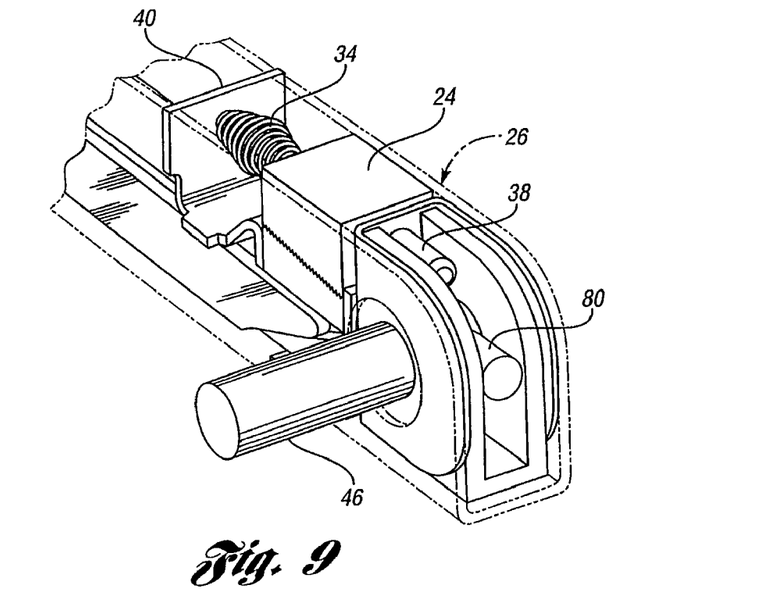
FIG. 9 is a view similar to the view of FIG. 8 wherein the fixed stop is shown in engagement with the armrest housing when the armrest is moved to its stowed position.
Figure 10:
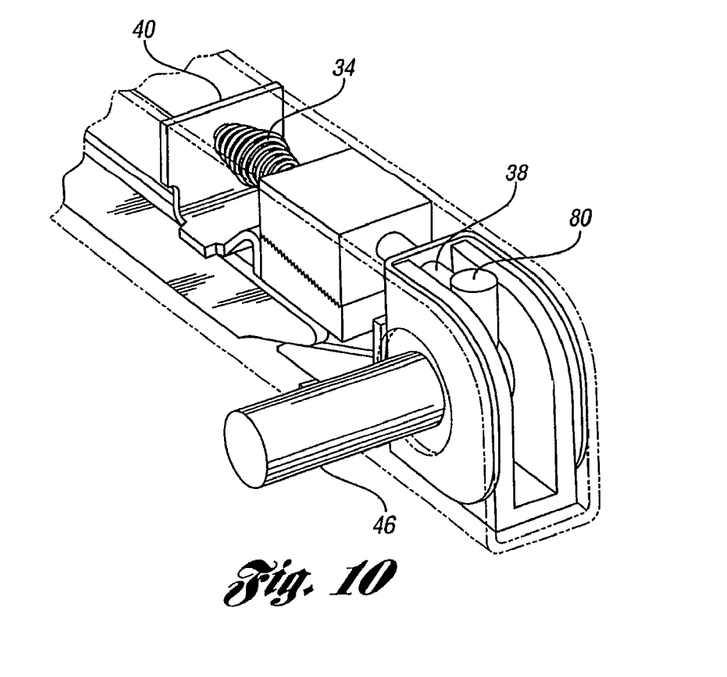
FIG. 10 is a view similar to the view of FIG. 9 wherein the armrest has been moved to its active position from its stowed position.

FIG. 9 shows the position of the armrest assembly relative to the pivot shaft 46 when the armrest assembly is in a stowed position. In contrast, FIG. 10 shows the same structure illustrated in FIG. 9 when the armrest assembly is in its active position with the rod 38 engaged with the stop 80.

The vehicle occupant may move the armrest assembly from the active position to the stowed position. The armrest assembly subsequently can be returned to its original active position without the need for readjusting the active position using the adjusting structure located within the armrest housing. This is a memory feature that allows the preferred active position to remain the same regardless of multiple adjustments of the armrest assembly between the stowed position and the active position.

The interface for the locking elements 24 and 42 may define a wedge surface as shown in FIGS. 3 and 4. If a torque limit feature is desired, the angle of the wedge surface can be designed so that a limit for the force on locking element 24 is created. If a vertical load on the armrest assembly is excessive, the locking element 24 then will be shifted to the right as viewed in FIG. 4 so that a torque overload is avoided. Further, the spring rate of spring 60 can be chosen for a given wedge surface angle so that a desired load limit is not exceeded. The spring rate for spring 34 can be chosen to establish a desired load limit.

Figure 11:
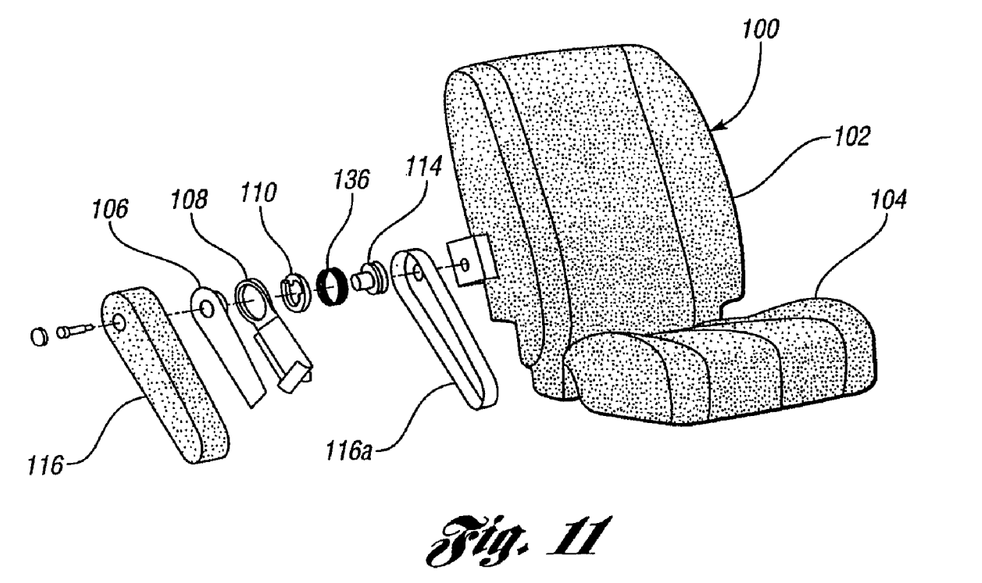
FIG. 11 is an exploded assembly view of an alternate embodiment of the invention.

FIG. 11 illustrates an alternate embodiment of the invention, wherein the armrest adjustment elements and the armrest memory elements are arranged concentrically with respect to the adjustment axis of the armrest. In FIG. 11, a vehicle seat, shown at 100, has a seat back portion 102 and a cushion occupant supporting portion 104. The seat 100 is secured in the usual fashion to a vehicle body and chassis structure. The armrest assembly includes a memory plate 106, a release wedge 108, a memory gear 110, a biasing spring 112, and a full travel stop spool 114.

The stop spool can be secured to the seat back frame. The armrest assembly is enclosed in an armrest cover, shown at 116a and 116b. The portion of the cover shown at 116 may be upholstered as shown. The elements seen in FIG. 11 are mounted on the axis of rotation of the memory plate 106 for rotary motion about the fixed full travel stop spool 114.

Figure 12A:
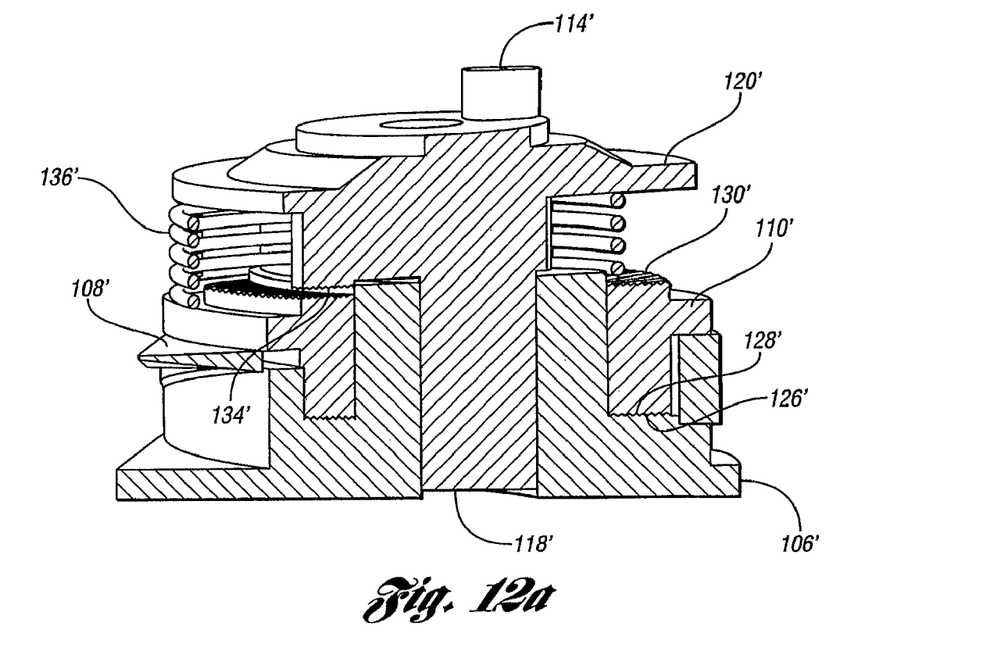
FIG. 12a is a first configuration of the elements of the assembly of FIG. 11 including a full travel stop spool, a biasing spring, a release wedge and a memory plate arranged in assembled relationship with the armrest in a fixed adjusted position.
Figure 12B:
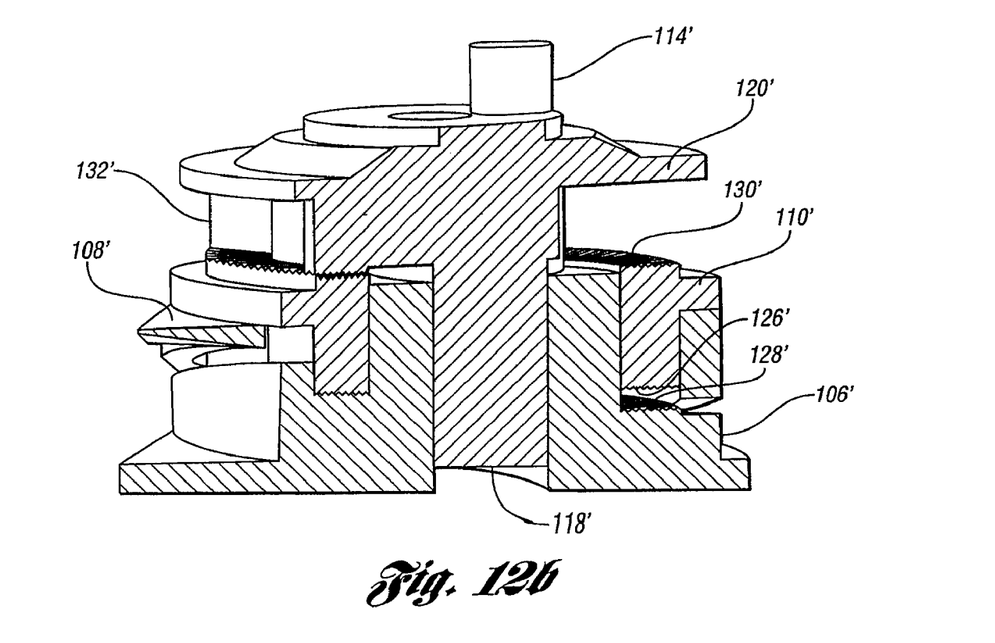
FIG. 12b is a cross-sectional view similar to the cross-sectional view of FIG. 12a wherein the memory gear is engaged with the stop spool and is held in a static position as the arm is free to rotate to a selected memory position.

FIGS. 12a and 12b show a cross-sectional view of a different configuration of the elements illustrated in FIG. 11 with the memory gear and the memory plate released. FIG. 12a shows a full travel stop spool 114' with a mounting hub 118' and a mounting flange 120'. The flange 120' can be secured to the seat frame and is held stationary. A memory plate 106' is mounted for rotary motion on the mounting hub 118'. A memory gear 110' is provided with serrations or teeth 126' that are engageable with serrations or teeth 128' on the memory plate 106'. The upper side of the memory gear also is provided with serrations, as shown at 130'. As will be described subsequently with reference to FIGS. 17a and 17b, full travel stop spool 110' is provided with stop shoulders at angularly spaced locations with respect to the rotary axis of the armrest assembly. These stop shoulders are engaged by stop shoulders formed on the memory gear. The arcuate spacing between the stop shoulders on the memory gear and the spacing of the stop shoulders on the full travel stop spool define the extent of relative travel of the armrest.

The memory gear serrations 130' are engageable with serrations 134' on the full travel stop spool. The serrations 134' are between the arcuate locations of the stop shoulders on the full travel stop spool. Similarly, the serrations 130' on the memory gear 110' are situated between the stop shoulders formed on the memory gear.

The memory plate 106' has stop shoulders angularly spaced with respect to the axis of the armrest assembly. The serrations 126' are located between the stop shoulders on the memory plate. The memory gear thus has stop shoulders on each axial side. This will be described further with respect to FIGS. 14a and 14b.

A biasing spring 136' in the assembly is mounted concentrically with respect to the axis of the full travel stop spool. The mounting spring normally biases the memory gear in a downward direction, as viewed in FIGS. 12a and 12b. The biasing force causes serrations 128' to be engaged by serrations 126 on the full travel stop spool, which locks the memory plate 122' to the memory gear. The memory plate and the memory gear thus can rotate freely with respect to the full travel stop spool until a stop shoulder on the memory gear engages a stop shoulder on the full travel stop spool. If the memory plate is rotated in the opposite direction, the memory gear and the memory plate will rotate as a unit in the opposite direction until the other stop shoulder on the memory gear engages the other stop shoulder on the full travel stop spool.

Figure 16A:
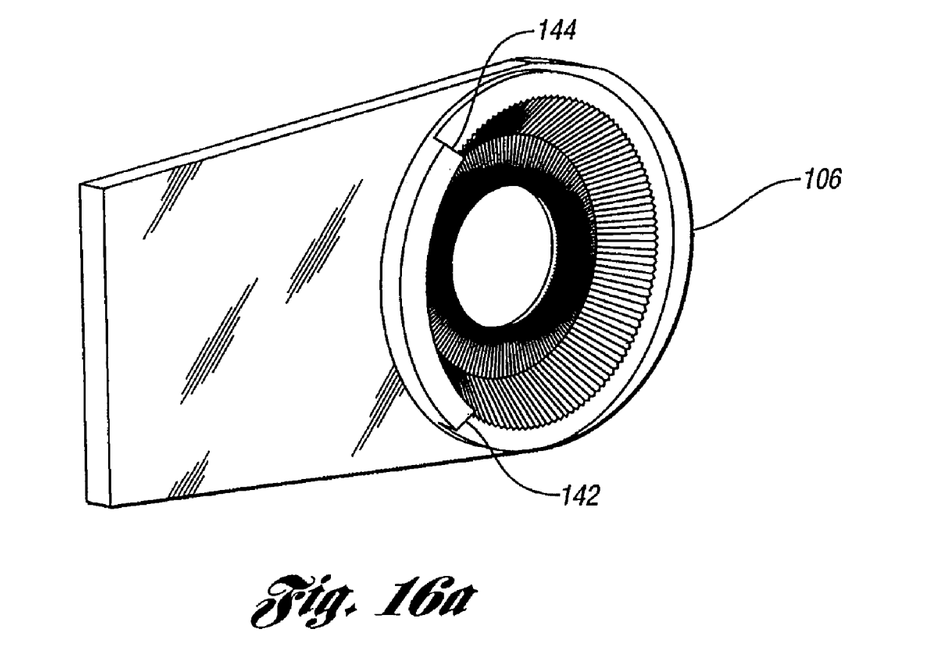
FIGS. 16a and 16b show opposite sides of the memory plate seen in FIGS. 11 and 13.
Figure 16B:
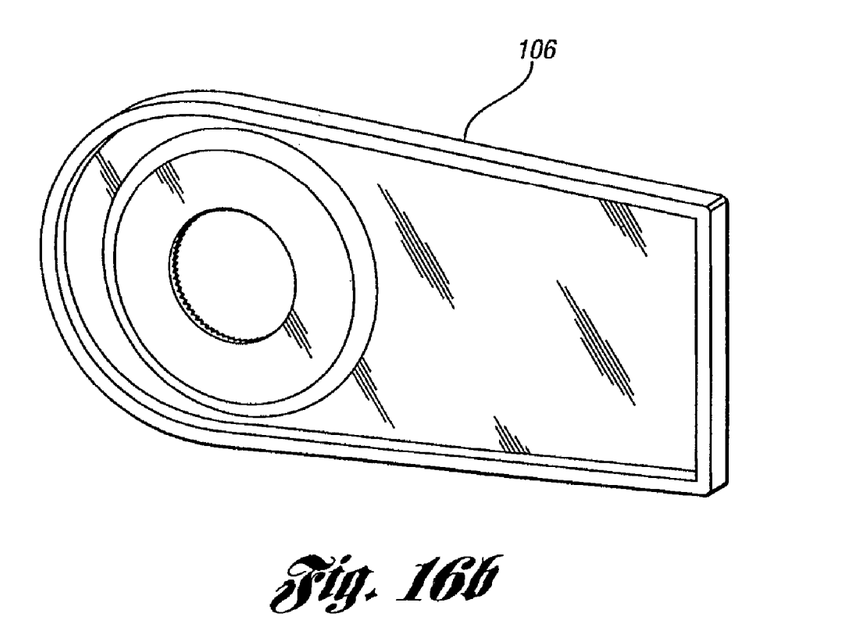

A release wedge 108' is situated between the memory plate 122' and the memory gear 110'. When the release wedge is in the position shown in FIG. 12a, the serrations 126' will be engaged by the serrations 128', thereby locking the memory plate to the memory gear. When the release wedge is shifted, the memory gear will separate from the memory plate, thereby releasing the engagement of the serrations 126' and 128' and engaging serrations 130' on the memory gear with the serrations 134' on the full travel stop spool. This will lock the memory gear to the full travel stop spool. At that time the memory plate may rotate relative to the memory gear until a stop shoulder on the memory plate, which will be described with reference to FIGS. 16a and 16b, engages stop shoulders formed on the lower side of the memory gear 110'.

If the stop shoulders on the full travel stop spool and the stop shoulders on the memory gear assume the same arcuate positions, the memory plate can move the full extent of the travel between the engagement stops on the full travel stop spool. If the memory gear is adjusted angularly relative to the full travel stop spool, the extent of travel of the memory plate will be diminished accordingly.

To change the extent of travel of the memory plate relative to the full travel stop spool, the release wedge can be shifted, as viewed in FIGS. 12a and 12b, which will cause disengagement of the serrations 126' and 128'. The memory plate then can be adjusted to any desired position. When the release wedge is shifted in the opposite direction, the memory plate again will be locked to the memory gear as the serrations 126' and 128' again are engaged. When the release wedge is shifted, serrations 134' will engage serrations 130', thereby locking the memory gear to the full travel stop spool as the memory plate is adjusted to its desired position. After the desired position is obtained by the seat occupant, the release wedge again will be released and the memory plate then will have a new arcuate position when the armrest is moved to a lowered position. The armrest can be adjusted in an upward stowed position, but when the armrest is returned to the selected position, that selected position will have been remembered. Subsequent adjustments of the armrest to the upward inactive position may occur, but when it is again returned to the selected position, the selected position again will have been remembered. The memory gear is held in a static position while the arm is free to rotate to a new memory position selected by the seat occupant.

The exploded assembly view of FIG. 11 has numerals that correspond to the numerals used in the adjustable armrest design of FIGS. 12a and 12b, although prime notations are added to elements in FIGS. 12a and 12b that have a counterpart in the design seen in FIG. 11.

Figure 13:
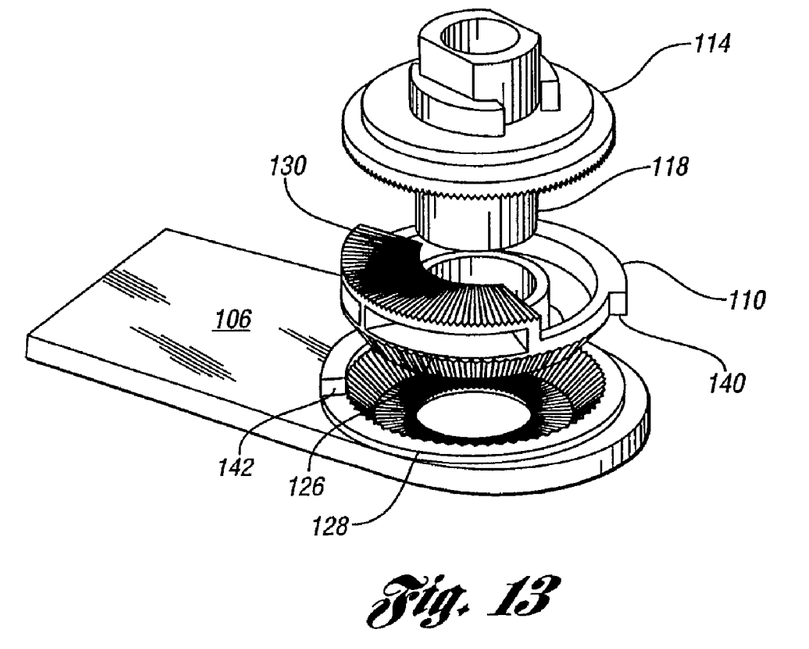
FIG. 13 is a partial assembly view in exploded form showing a fixed stop spool, a memory gear and a memory plate.

FIG. 13 is an exploded subassembly view of the armrest configuration of FIG. 11 showing the armrest full travel stop spool 114, the memory gear 110 and the memory plate 106. Seen at 138 and 140 are engagement stop shoulders formed on the memory gear 110. Shoulders 138 and 140 are formed on the memory gear, as best seen in FIG. 14b. They engage, respectively, shoulders 142 and 144 on the memory plate when the angularity of the memory plate is changed relative to the memory gear.

Figure 17A:
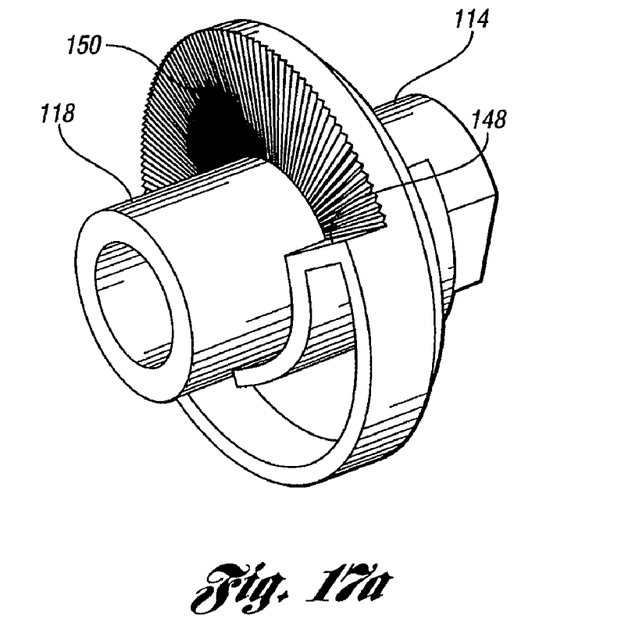
FIGS. 17a and 17b show opposite sides of the armrest stop spool seen in FIGS. 11 and 13.
Figure 17B:
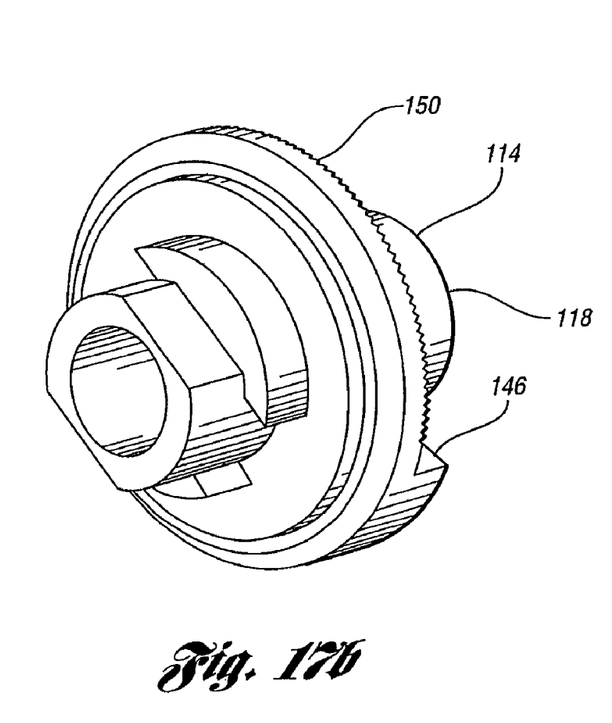

The full travel of the memory plate and the armrest is determined by the angular spacing of engagement stop shoulders, best seen in FIGS. 17a and 17b at 146 and 148. Serrations 150 are formed on the full travel stop spool 114 throughout the arcuate extent between engagement stop shoulders 148 and 146. These serrations engage serrations 130, thereby locking the memory gear to the stationary full travel stop spool 114 when the release wedge 106 is shifted. This causes memory gear 110 to move into engagement with the full travel stop spool against the opposing force of spring 136. As previously indicated, when the memory gear is locked to the full travel stop spool, the memory plate becomes disengaged from the memory gear, thereby allowing the memory plate to be adjusted by the seat occupant to a selected position as the memory plate pivots on the hub 118.

Figure 14A:
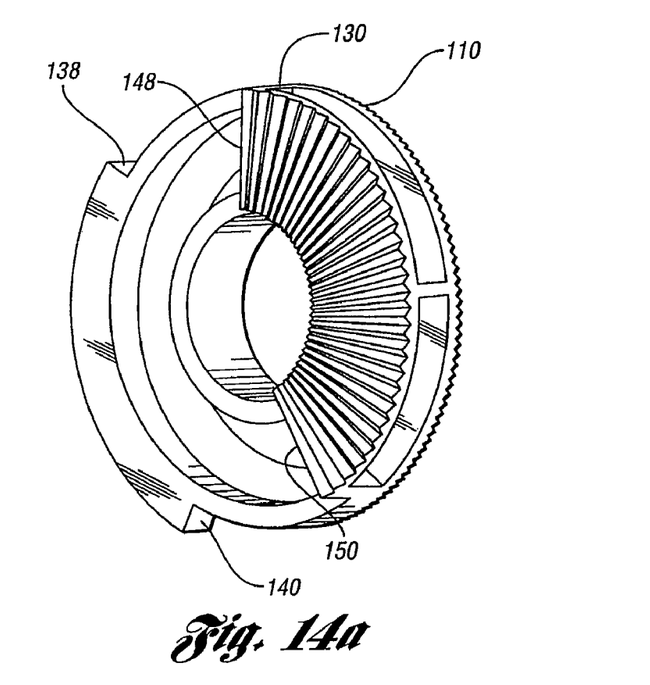
FIGS. 14a and 14b show opposite sides of an alternate configuration of a memory gear.
Figure 14B:
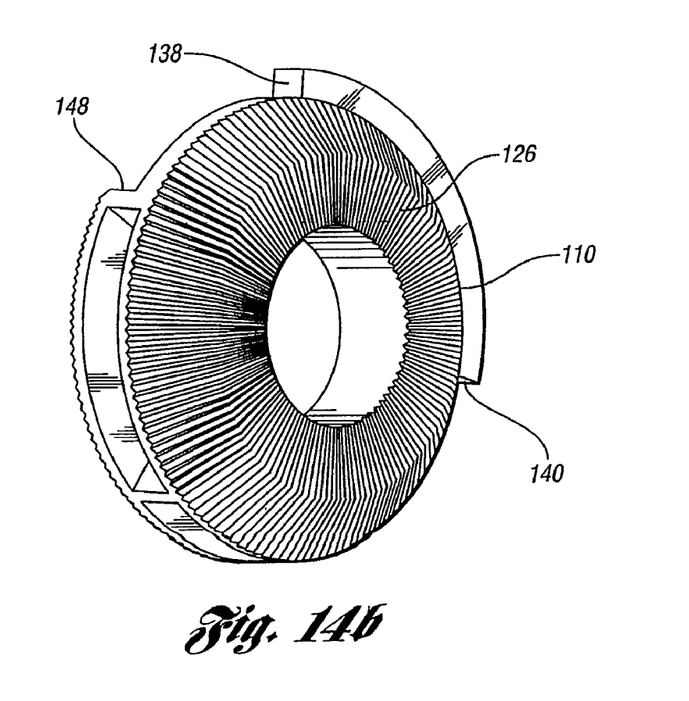
Figure 15:
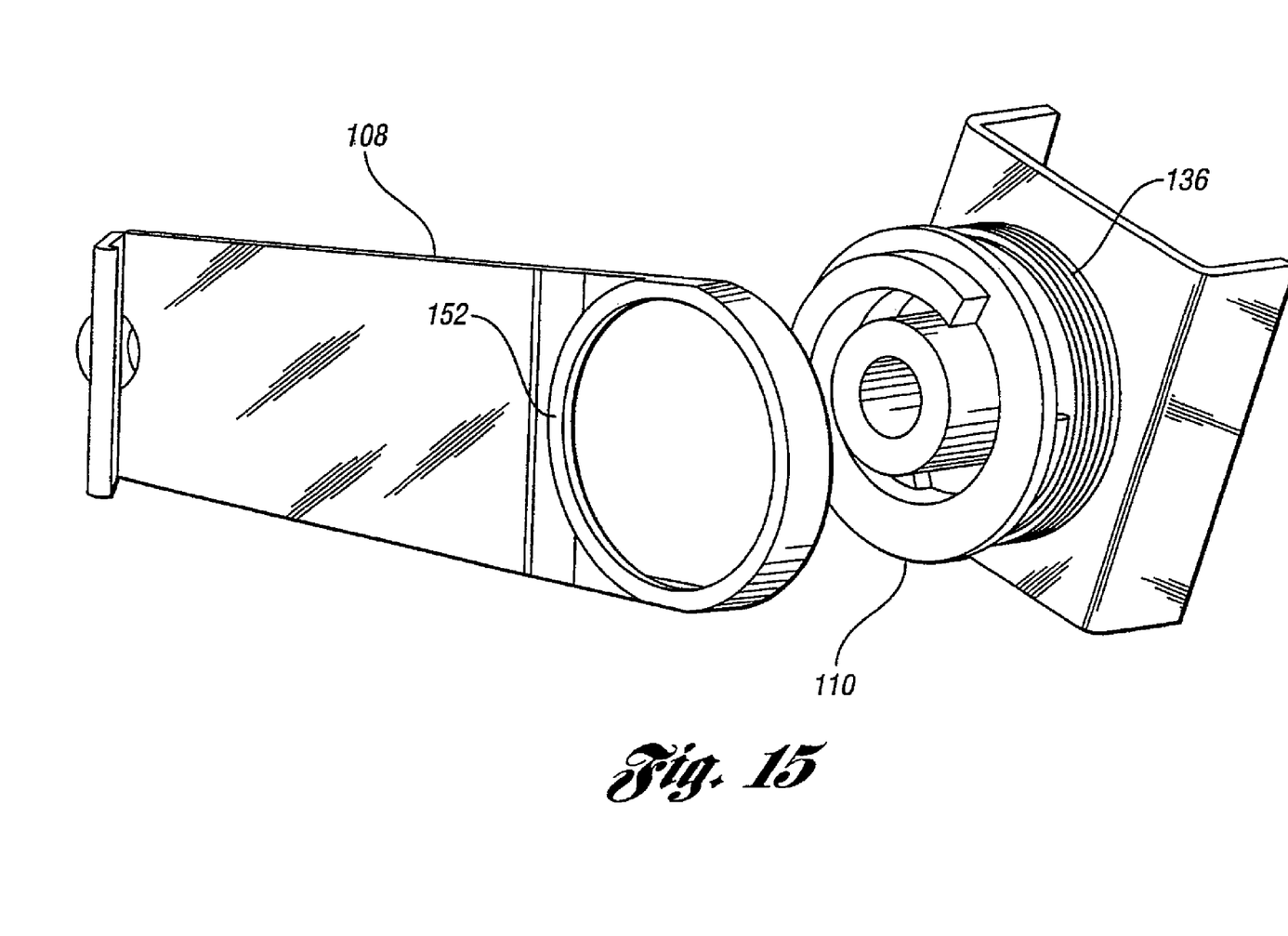
FIG. 15 is a partial assembly view of elements seen in FIG. 11 arranged in exploded form.

The shoulders on the memory gear that engage the arcuately spaced shoulders on the full travel stop spool are seen best in FIG. 14a at 148 and 150. The angularity of the wedge formed on the memory plate is best seen in FIG. 15 at 152.

The serrations 128 will engage the serrations 126, as previously described, and serrations 130 will engage serrations 134, as previously described, so that the memory plate can be adjusted in either direction until one of the adjustment stop shoulders on the memory plate engages an adjustment stop shoulder on the memory gear.

Although particular embodiments of the invention have been disclosed, it will be apparent that modifications may be made to the invention without departing from the scope of the invention. All such modifications and equivalents thereof are intended to be covered by the following claims.

What is claimed is:

1. An adjustable armrest assembly for use with a vehicle seat, the vehicle seat comprising a seat frame, the seat frame having a seat cushion support portion and a seat back portion; the armrest assembly comprising:
    a full travel stop spool with a pivot axis secured to seat back portion;
    a memory gear pivotally mounted for rotary adjustment about the pivot axis;
    the memory gear and the stop spool having locking features on adjacent surfaces in the memory gear and the stop spool;
    a memory plate forming pivot of the armrest assembly that is mounted for pivotal movement of the armrest assembly between an active armrest assembly position and a stowed, inactive position;
    the memory plate and the memory gear having locking features on adjacent surfaces of the memory gear and the memory plate;
    a spring normally biasing the memory gear into engagement with the memory plate; and
    an operator actuated release wedge between the memory plate and the memory gear to selectively shift the memory gear into and out of engagement with the stop spool and to simultaneously shift the memory gear out of and into engagement, respectively, with the memory plate;
    the memory plate being a part of the armrest assembly that supports an arm of the operator.

2. The adjustable armrest assembly set forth in claim 1 wherein the memory gear is biased by the spring normally into locking engagement with the memory plate when the release wedge is shifted in one radial direction relative to the pivot axis and is shifted into locking engagement with the stop spool when the release wedge is shifted relative to the pivot axis in the opposite radial direction.

3. The adjustable armrest assembly set forth in claim 2 wherein the memory gear has first angularly spaced stop shoulders one side thereof and second angularly spaced stop shoulders on an opposite side thereof;
    the stop spool having angularly spaced stop shoulders engageable with first stop shoulders on the memory gear;
    the memory plate having angularly spaced stop shoulders engageable with the second stop shoulders in the memory gear.

4. The adjustable armrest assembly set forth in claim 1 wherein the memory gear has first angularly spaced stop shoulders on one side thereof and second angularly spaced stop shoulders on an opposite side thereof;
    the stop spool having angularly spaced stop shoulders engageable with first stop shoulders on the memory gear; and
    the memory plate having angularly spaced stop shoulders engageable with the second stop shoulders in the memory gear.

* * * * *